(12) United States Patent
Madden, III

(10) Patent No.: US 7,008,158 B2
(45) Date of Patent: Mar. 7, 2006

(54) BOLT OR NUT LOCKING FASTENER AND FASTENING SYSTEM

(76) Inventor: James William Madden, III, 2111 Weatherby Way, Petaluma, CA (US) 94954

( * ) Notice: Subject to any disclaimer, the term of this patent is extended or adjusted under 35 U.S.C. 154(b) by 0 days.

(21) Appl. No.: 10/774,204

(22) Filed: Feb. 5, 2004

(65) Prior Publication Data

US 2005/0175430 A1    Aug. 11, 2005

(51) Int. Cl.
*F16B 39/10*    (2006.01)
(52) U.S. Cl. ...................................... 411/119
(58) Field of Classification Search ........ 411/119–121, 411/124, 131, 531, 533; D8/399
See application file for complete search history.

(56) References Cited

U.S. PATENT DOCUMENTS

| | | | | |
|---|---|---|---|---|
| 272,971 A | * | 2/1883 | Moored | 411/124 |
| 532,027 A | * | 1/1895 | Clark | 411/131 |
| 718,744 A | * | 1/1903 | White | 411/120 |
| 824,330 A | * | 6/1906 | Barnard | 411/131 |
| 1,081,661 A | * | 12/1913 | Dashner | 411/117 |
| 2,190,075 A | * | 2/1940 | Love | 411/120 |
| 2,252,379 A | * | 8/1941 | Johns | 52/166 |
| 5,022,875 A | * | 6/1991 | Karls | 440/49 |
| 5,711,644 A | * | 1/1998 | Regnath et al. | 411/131 |
| 6,282,857 B1 | * | 9/2001 | Rubenacker | 52/410 |
| 6,669,419 B1 | * | 12/2003 | Fleetwood | 411/131 |
| 6,758,646 B1 | * | 7/2004 | Ishida | 411/119 |

* cited by examiner

*Primary Examiner*—Flemming Saether

(57) ABSTRACT

A fastening system and assembly functions as a washer ring components but also provides for locking the bolt head end to prevent rotation of the threaded shaft while tightening the nut. The same device can be used alone on the threaded end of a bolt, or in conjunction with another device on the bolt head end, to locking the nut after tightening. The fastener has a flat face on one surface but is sufficiently thick to receive either the nut or the bolt head in a cavity formed in the other surface. The cavity is co-axial with a central bore passing through the fastener, with the cavity having larger interior dimensions matched to the profile of the intended nut or bolt head. The fastener may also included one or more mounting or fastening holes outside of the central bore for securing it to a fixed object, typically the structure to be joined by the fastener. Thus by inserting the bolt head into the cavity and securing the fastener via the mounting holes rotation of the threaded shaft is prevented as the nut is inserted and threaded onto the shaft of the bolt. Accordingly, one can then readily tighten the bolt without grasping or gripping the bolt head.

15 Claims, 5 Drawing Sheets

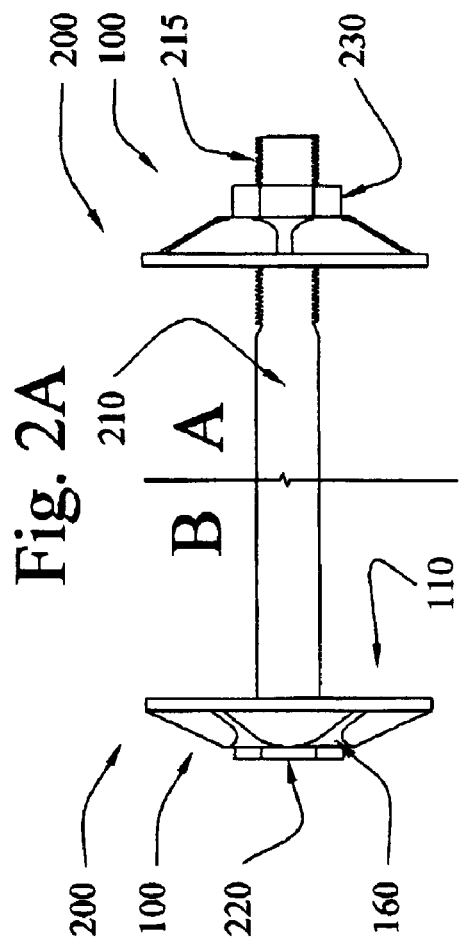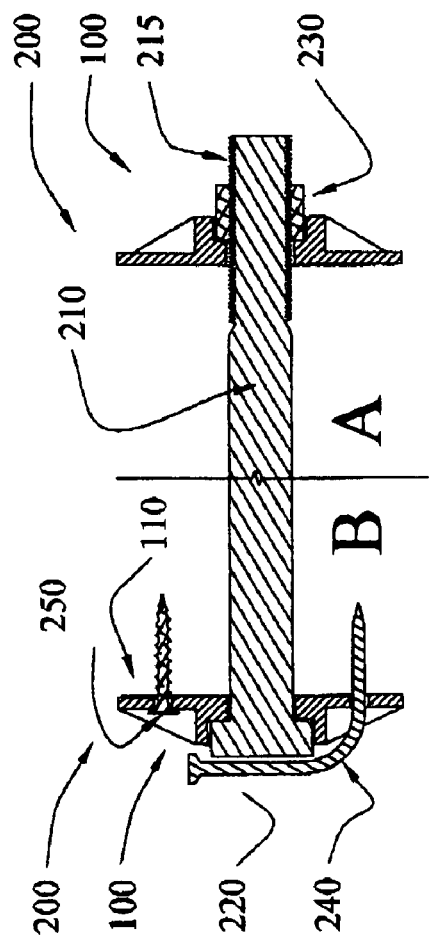

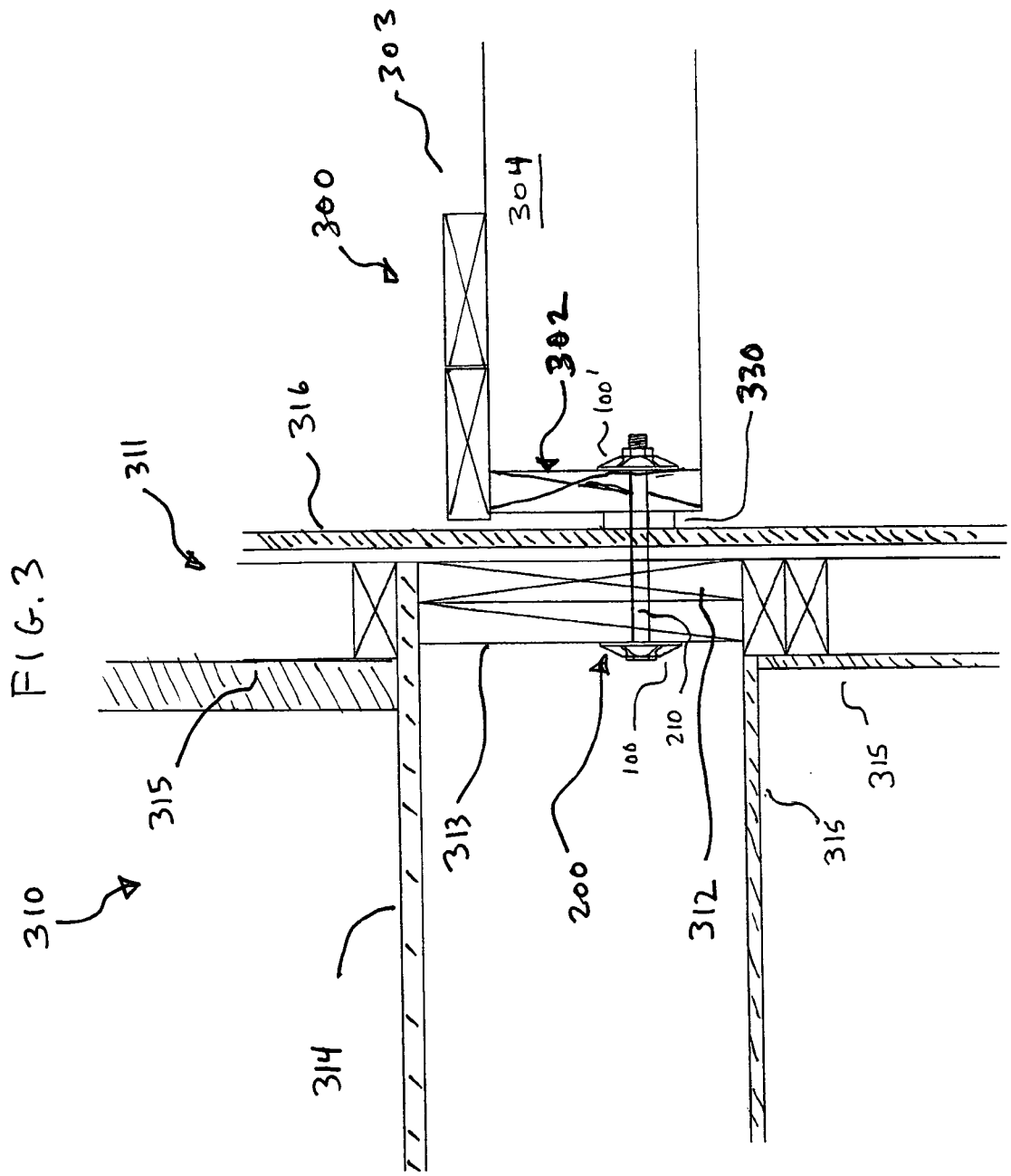

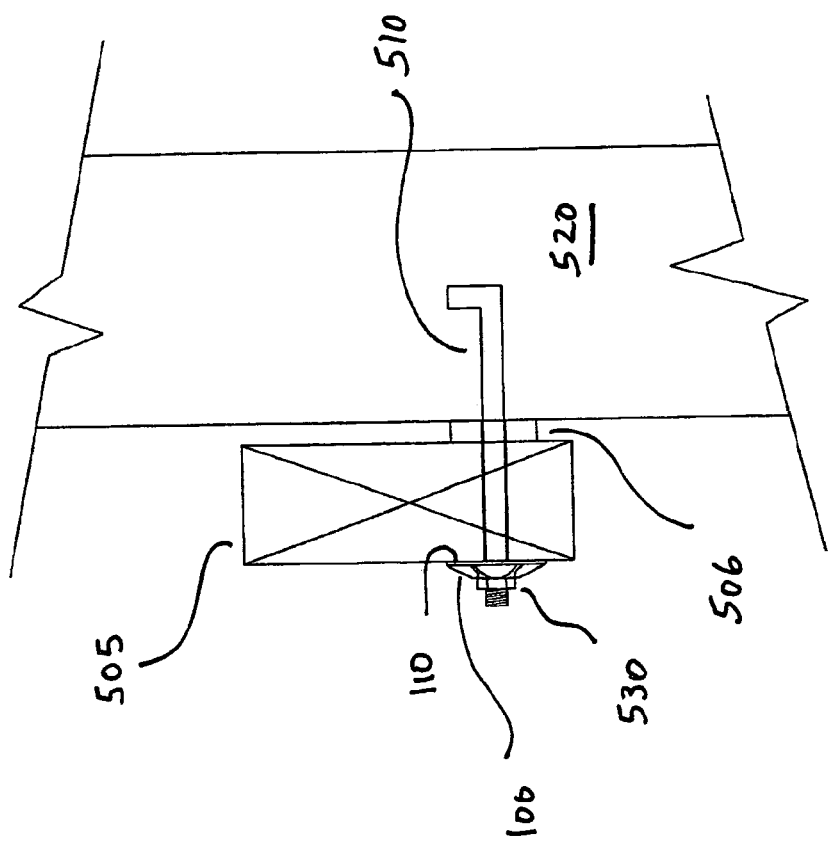

BOLT OR NUT LOCKING FASTENER AND FASTENING SYSTEM

BACKGROUND OF INVENTION

The present invention relates to nut and bolt fasteners and fastening systems, and more particularly to locking fasteners used in building structure.

Nut and bolt fasteners are commonly used in joining structure components in building. As bolts must frequently have an end that extends into a crawl space the nut and bolt combination requires two people for installation, one to hold the head of the bolt on one side of the crawl space and other to turn the nut on the other side of the crawl space.

Further, such fasteners are subject to loosening, from either shrinkage, warpage, settling or vibration of the nut and bolt. Frequently, the crawl space become inaccessible after the bolt is installed, in which case loose bolt are ignored, even if inspection from the nut side reveals they need to be tightened.

It is therefore a first object of the present invention to provide an improved method of installing nut and bolt fasteners, such that a single individual can complete the installation quickly, eliminating the need for two individuals working on opposite sides of an inaccessible area or crawl space.

Another objective is to provide a method of re-tightening such nut and bolt fasteners without the need to enter an inaccessible area or crawl space.

Yet another object is to provide a fastening system that is immune to vibration, without compromising the aforementioned objectives.

SUMMARY OF INVENTION

In the present invention, the first object is achieved by deploying an annular fastening component that replaces a common washer. The fastener has a flat face or flange that faces the structure to be secured or fastened. The opposing face has a cavity for receiving the bolt head. The cavity conforms to the bolt head outer perimeter dimensions but is preferably shallower in depth than the height of the bulkhead. The fastener of the instant invention receives either the nut or bolt head in engaging attachment, and thus rotates about the bolt shaft, when turning the nut. The fastener has one or more through holes disposed around the perimeter for attachment, via a nail or screw, to the structure on the bolt head side. Accordingly, securing the fastener to the structure after engaging the bolt head in the cavity prevents rotation of the bolt as the nut is engaged and tightened onto the bolt shaft, permitting a single person to install the nut and bolt.

A second aspect of the invention is characterized in that the fastener is deployed on the nut side of the bolt. Should the bolt loosen, it can be easily retightened by rotating the nut and fastener together, without the need to access the bolt head in a remote or inaccessible part of the structure.

A third aspect of the invention is characterized in that securing the fastener deployed in combination with the nut also prevents the nut from vibrating loose.

The above and other objects, effects, features, and advantages of the present invention will become more apparent from the following description of the embodiments thereof taken in conjunction with the accompanying drawings.

BRIEF DESCRIPTION OF DRAWINGS

FIG. 2A is an exterior elevation of the fasteners of FIG. 1 as used in combination with a nut and bolt as a fastening system for joining structure A and B.

FIG. 2B is a cross section through the elevation of the fastening system in FIG. 2A.

FIG. 3 is an exterior elevation of the fastener of FIG. 1 as used in combination with the nut and bolt as a fastening system for joining a deck via a decking ledger to the side of a structure. The deck and structure are illustrated in cross-section.

FIG. 5 is an exterior of the fastener of FIG. 1 as used in combination with a nut and bolt as a fastening system for securing for joining a ledger to concrete. The ledger and portions of the concrete structure are illustrated in cross-section.

DETAILED DESCRIPTION

Figure 1A:
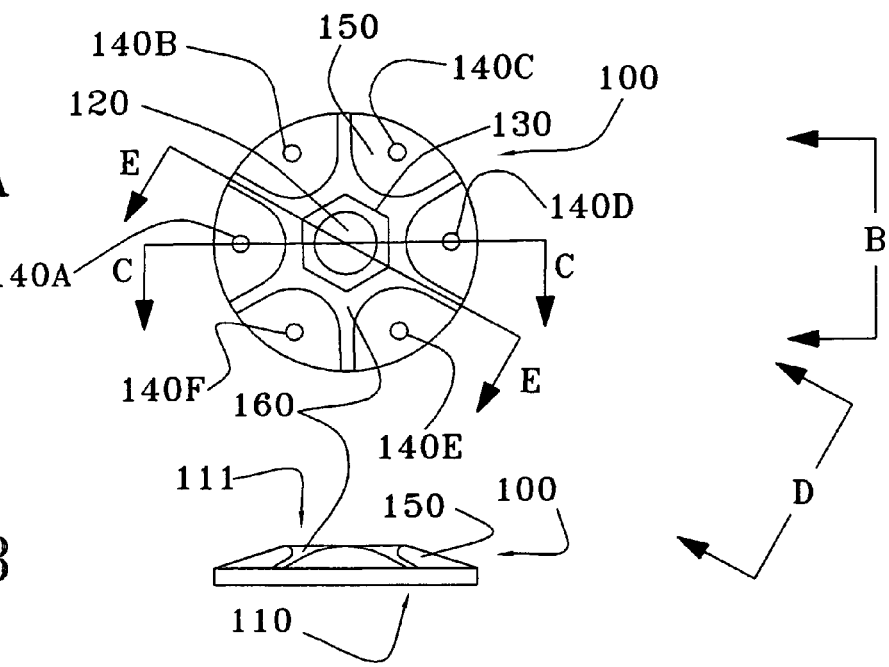
FIG. 1A is a plan view of a preferred embodiment of the fastener.

In accordance with the present invention, FIG. 1A is a plan view of a preferred embodiment of the fastener 100. Circled letter B and D with extending arrowheads correspond with the elevations in FIGS. 1B and D respectively, with the arrows orientation reflecting the viewing directions in the elevations. Circled letter pairs B—B and C—C indicate the corresponding positions for the cross-sectional elevations in Figures B and C respectively, with the arrows orientation reflecting the viewing directions in the elevations. Thus, fastener 100 has the general shape of a plate like annulus with the lower surface 110 being substantially planar or flat. A central bore 120 extends from the upper surface to the lower surface 110, being suitably dimensioned to fully receive the threaded shaft portion of a bolt when inserted of threaded shaft there through. The central bore 120 opens to larger cavity 130 that extends to the upper surface. The cavity 130 is dimensioned for receiving a mating bolt head, nut or other non-circular rotating fastener. Thus cavity 130 is co-axially disposed with respect to the central bore such that a bolt inserted through the bore, by passing the threaded end into the cavity from the upper surface side, will be retained in the fastener at the point at which the bolt head extends laterally to engage the bottom surface of cavity 130 that surrounds bore 120.

Figure 1B:
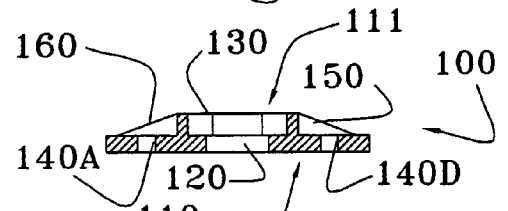
FIG. 1B is an exterior elevation of the fastener of FIG. 1A corresponding to section markers B–B'.
Figure 1C:
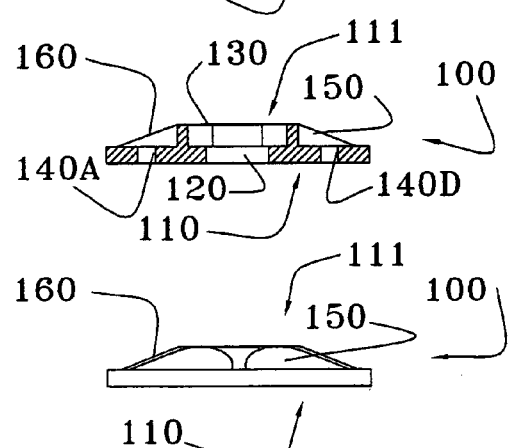
FIG. 1C is a cross-sectional elevation of the fastener of FIG. 1A, corresponding to section markers C–C'.
Figure 1D:
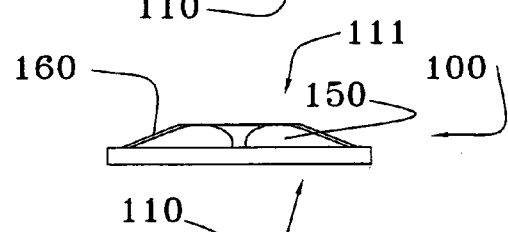
FIG. 1D is a cross-sectional elevation of the fastener of FIG. 1A, corresponding to section markers D–D'.
Figure 1E:
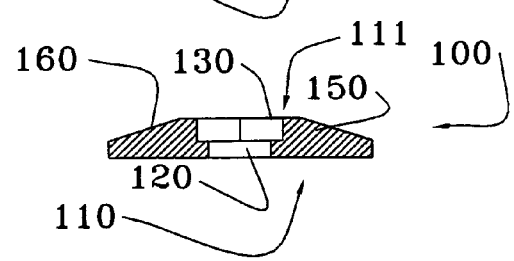
FIG. 1E is an exterior elevation of the fastener of FIG. 1A corresponding to section markers E–E'.

Referring to orthogonal cross sections of cavity 130 in FIGS. 1C and 1E it should be apparent that it has a non-circular shape, in this embodiment being hexagonal, that is slightly larger than the dimensions of a matching of a work piece, such as common nut, bolt head or other non-circular objects with the complimentary external shape such that the work piece when inserted into cavity 130 cannot rotate independently about the axis defining the central bore 120 without also rotating fastener 110.

Fastener 100 also includes one or more mounting or fastening holes 140 (such as 140 A, B, C, D, E or F) that extending from the flat lower surface 110 toward the upper surface, each mounting holes being located in a region outside the perimeter all of the cavity 130 near the edge of the fastener.

The cross-sectional elevation of the fastener 100 in FIG. 1C shows that perimeter region penetrated by mounting holes (140A and 140D in this embodiment) is thinner than the combined length of bore 120 and cavity 130. The corresponding exterior elevation, in FIG. 1B shows a series of ribs 150 that extend from the wall, which defines cavity 130, to the edge of fastener 100, separating each of the holes 140 C, D and E. As shown in the plan view of FIG. 1A, each of the ribs is preferably curved to form a plateau or ledge about each of the mounting holes 140. As it is desirable in this preferred embodiment to reduce the mass of fastener 100 by thinning the peripheral region around the mounting holes 140, the rib structure preserve the strength and rigidity to enable a greater removal of mass. The ribs gradually change in height as they extend in the radial direction from cavity 130, tapering to conform to about the edge thickness of the fastener 100. As cavity 130 is optionally formed in any suitable polygonal shape that might be used for the head of a bolt or nut, a separate mounting hole is preferably deployed between each facet of the polygon of cavity 130 and the edge of the fastener. Thus, as cavity 130 is hexagonally shaped to receive and engage a hexagonal nut or bolt head, the ribs are spaced apart by about 60 degrees, thus the exterior elevation in FIG. 1D, having a viewpoint centered on the rib adjacent mounting hole 140D, best illustrates a preferred embodiment of for tapering the rib height. FIG. 1E is a cross-section through fastener 100 taken orthogonal to the exterior elevation in FIG. 1D, showing 3 of the 6 polygon facets that in cavity 130, and the retaining ledge at the bottom of cavity 130 adjacent to the start of the narrower bore 120. The thickness of the edge of the fastener about hole 140 is preferably about 3/16" for a fastener intended to be used with a 5/8" to 1/2 diameter bolt.

Figure 4:
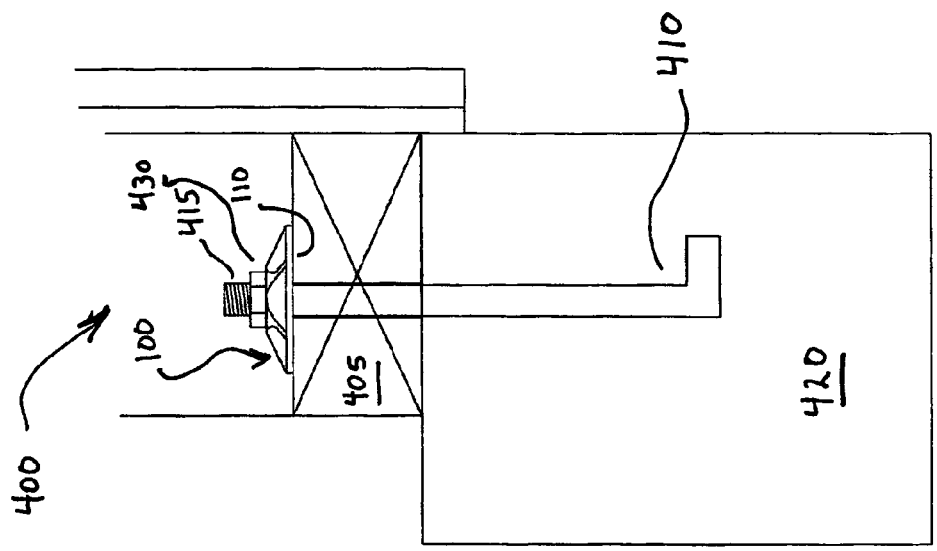
FIG. 4 is an exterior elevation of the fastener of FIG. 1 as used in combination with the nut with a mudsill anchor bolt as a fastening system for securing a structure to a foundation footing. The foundation footing and portions of the structure are illustrated in cross-section.

In preferred embodiments, as illustrated in FIGS. 2, 3 and 4 showing alternative methods of use, the inventive fastener 100, is dimensioned in conforming to a Uniform Building Code mudsill washer, with the circular bore and cavity dimensioned to receive a mudsill anchor bolt.

FIGS. 2A and 2B illustrate the use of fastener 100 for joining overlapped structure A and B as part of fastening system 200. FIG. 2A is an exterior elevation of the installed fastening system, comprising the fastener of FIG. 1 in combination with the nut and bolt for joining structure A and B. FIG. 2B is a cross sectional elevation of the fastening system components in FIG. 2A. One fastener 100 is disposed to engage the non-circular head of bolt 210, whereas another faster 100 is disposed on the threaded shaft section 215 of bolt 210 wherein the then threaded nut is retained in the cavity forming in fastener 100'. It should be appreciated from the Figure that although fastener 100' can be replaced by a common washer of the same diameter, fasteners 100 and 100' replace conventional washers that would otherwise be deployed, being of sufficient size and strength to distribute the compression loading from tightening the nut onto structures A and B.

Both structures A and B have contiguous pre-drilled holes forming a single bore for receiving bolt 210. Initially, before installation of bolt 210 into the pre-drilled hole, fastener 100 is inserted onto the threaded end 215 of bolt 210 with the flat face oriented toward the threaded end 215 such that cavity 120 will receive bolt head 220. Next, the threaded end 215 of bolt 210 is inserted through the pre-drilled hole in structure B in the pre-drilled hole in structure A such that the threaded end 215 of bolt 210 extends outward from structure A. To the extent that a second fastener 100' is used rather than a washer, it is now inserted planar side first on the threaded end 215 of bolt 210 such that the threaded end extends past the cavity opening.

However, prior to tightening nut 230 fastener 100 is attached to structure B via a mounting hole, illustrated in the cross-section of the fastening system in FIG. 2B via at least one screw 250 inserted through at least one mounting hole 140 near the periphery of fastening 100. Further, in a more preferred method of use, a nail 220 is only partially inserted through another peripheral hole 140, with the portion of nail 250 extending outward from fastener 100 and bent about 90 degrees to cover the head 220 of bolt 210. Thus, nail 220 prevent bolt 210 from backing out of the hole in structures A and B while nut 230 is inserted onto the threaded end 215 of bolt 210. A 16D nail 220 generally offer sufficient and is readily bent to cover the head of the bolt to prevent the bolt form pushing backward or to the left as force is applied while tightening nut 230 from the right side of structure A. As fastener 100 being secured to structure by screw 250 will not rotate it effectively, lock the bolt head to prevent it from spinning so that a single worker can tighten nut 230 entirely from the right side of structure A.

It should be noted that as the depth of the cavity in fastener 100' is preferably less that the thickness of the corresponding nut 230. Accordingly, nut 230 can be inserted into the cavity of fastener 100' before being thread onto the threaded section 215 of shaft 210. However, as fastener 100' freely rotates and slides about the threaded portion 215 of shaft 210, fastener 100' can be inserted onto shaft 210 before nut 230 is threaded without detriment to assembly. In this case, fastener 100' is translated toward the end of the bolt to receive nut 100 in the corresponding socket by the installers. As the depth of the cavity in fastener 100 is less than the thickness of the corresponding mating nut, the nut is freely tightened by grasping and rotating the portion that extends beyond the top or upper surface of fastener 100'. Fastener 100 prevents the rotation of bolt 210 as nut 230 is rotated to the desired torque to tightly secure structure A and B together without the need to grasp both the nut and the head of the bolt . . . As will be further described with respect to FIGS. 3, 4 and 5 this greatly simplifies construction, as two workers are not required when structures A and B extend laterally to form a barrier for passing and holding a wrench to secure the head of bolt 210 while nut 230 is tightened by rotating onto the threaded section 215 of bolt 210.

Although fastener 100' is intended to rotate to with nut 230 during installation, the subsequent secure attachment to structure A via one or more of the mounting holes prevents rotation of the engaged nut 230 retained in the matching cavity. Accordingly, the fastening system offers several benefits, which include, labor saving through faster installation, or by a single installer when two installers would otherwise be required and preventing the detachment of a structure from vibration that can loosen the retaining nut. Further, to the extent that the structure should move, warp or the material that form structure A and B shrink, the nut is readily re-tightened by removing the screw from the fastening or mounting hole and retightening the nut.

FIG. 3 is an elevation of the installed fastening system, comprising the fastener of FIG. 1 in combination with the nut and bolt typical on any installation for joining ledgers to wood framed buildings, or other installing for wood-to-wood connections, in this particular example for joining a decking ledger to the side of a structure. The structure are shown in cross-section while the fastening components are shown in an exterior view for simplicity. Deck 300 is attached to the exterior wall 311 of house 310 using fastener 200 to connect rim 312 and adjacent blocking structures 313 of house 310 to rim or ledger 302 of deck 300. It should be understood that decking boards 303 rest on the joists 304 supported by ledger 302. As Blocking 313 is generally located in either a crawl space or between the sub floor 314 and sheetrock 315 the installation according to the method described with respect to FIG. 2 permits the installer to drill hole from the deck side or the hose side, while inserting a plurality of affixed fasteners 100 and bolts 210 on one entry into the crawl space. It should also be noted in the Figure that either a spacer 330 or metal flashing (not shown) is deployed between the siding of the house 316 and the deck ledger 302 to meet building code requirements if the deck contacts the earth, the spacer being preferred to eliminate the entrapment of water at the interface of the decking boards and ledger with the siding.

FIG. 4 is an exterior elevation of the installed fastening system, comprising the fastener 100 FIG. 1 in combination with a mudsill anchor bolt 410 secured in the foundation footing. In this application fastener 100 is used as part of a fastening system 400 in combination with a mudsill anchor bolt 410 to secure a mudsill or plate 405 to the concrete foundation or footing 420. Anchor bolt 410 terminates in the concrete footing with a short section disposed at a right angle to the bolt shaft, which extended upward through a hole drilled in mudsill 405 to terminate in a threaded section.

After the mudsill plate stock is installed over the anchor bolts, a fastener 100 is inserted over each anchor bolt over such that the flat or planar face 110 is contact with the upper surface of mudsill 405. As the threaded portion 415 of anchor bolt 410 extended through the bore 120 and past the end of cavity portion 130 on the upper surface of fastener 100, a ⅝" machine nut 415 (corresponding to a standing ⅝" anchor bolt required under the UBC), is then threaded onto the shaft of anchor bolt 410. The appropriate torque is then applied to tighten nut 430 after it is engaged in cavity 130 of fastener 100. Fastener 100 is preferably secured to mudsill 405 by a screw or nail to prevent nut 430 from becoming loose due to vibration and/or shrinkage or movement or mudsill 405.

It should be noted that in most construction methods it is preferable to secure the faster that engages a nut to the structure by using a screw, such that the nut is easily retightened on movement or shrinkage of the structure, by simply unscrewing the fastener and rotating the nut. Alternatively, once the screw or nail is removed fastener 100 can be rotated directly to turn the nut. In this case, it is desirable that the upper surface of fastener 100 have a standard size hexagonal shape to accommodate standard or adjustable wrenches. It should be further appreciated that the hexagonal, or any polygonal shape, can extend above or be used in place of the rib structure 160 that isolate the planar regions around each of mounting or fastening hole 140. Alternatively, it should be apparent to one of ordinary skill in the art that the nut and fastener can be rotated by a tool that having a complimentary matching pattern to engage the upper surface of fastener 100 in FIG. 1.

FIG. 5 is an exterior elevation of the installed fastening system, comprising the fastener of FIG. 1 in combination with a nut and bolt for joining a ledger 513 to concrete retaining wall 520. In this example, fastener 100 is used as part of a fastening system 500 in combination with a ⅝" anchor bolt 510 to secure a horizontal ledger 513 to a concrete wall, beam or pier 520. Anchor bolt 510 terminates in the concrete wall with a short section disposed at a right angle to the bolt shaft, with the opposite or threaded end extending laterally through a hole drilled in ledger 505. Thus, the bore side of fastener 100 is inserted over the treaded end of bolt 510 such that the flat or planar face 110 is contact with the outer surface of ledger 505. The threaded portion of bolt 510 thus extends through the central bore 120 and outside the cavity 130 at the upper surface of fastener 100. Accordingly, machine nut 530 is then threaded onto the shaft of anchor bolt 530, eventually engaging fastener 100 in cavity 130. Then, after securely tightening nut 515 to the specified torque, fastener 100 can be secured to ledger 505 by a screw or nail to prevent nut 530 from becoming loose due to vibration and/or shrinkage or movement or ledger 505. The Ledger is preferably spaced away from concrete wall by a thick washer 506 to prevent the accumulation of condensed moisture at the interface between the wood ledger 505 and concrete wall 520. Thus, ledger is firmly secured to concrete.

Other application of the inventive fastener and fastening system include, without limitation, the use with LTT's, HTT's and MTT's to secure one structure to another. The orientation or geometry of the secured structures includes scissoring or lapping two or more members together. As such the fastener is applicable to constructing all manner of retaining walls, post to lagging connections, or locking any through bolt, nut or lag bolt, and can be used to construct stair stringers, docks, piers for permanent or temporary structures.

Alternative embodiment of the fastener of the instant include variations of the cavity dimensions, for example to receive a nut or bolt head having three or more sides, as well as to receive any common nuts and bolt heads. The depth of the cavity can be less than the thickness of the bolt or nut, or greater provided the nut or fastener can be independently rotated without the need to grasp a portion of the nut that extends beyond the upper surface of the fastener. The outer dimension of the fastener need not be circular, as it can be any arbitrary shape or even square. Alternative shapes may include fastening through hole around the nut or bolt-retaining cavity as well features to receive or create other fixtures that prevent rotation of the fixture. Such fixtures can attach directing to the structure that is being joined or otherwise act as rotation stops, for example by an edge portion extending 90 degrees from the bottom surface, that would be placed flush against the adjacent side of a beam, post or ledge that has a hole drilled there through for receiving the bolt. Further, in fastening systems the bolt head or screws used to fix the fastener to the structure can have specialized shapes or sizes that deter vandalism, such as SEX screw or torx style screw or bolt head.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A fastener comprising;
    a) a plate having
        i) a substantially planar lower surface,
        ii) an upper surface opposing said lower surface,
    b) a polygonal shaped cavity of uniform lateral cross-section along its axial length extending downward from the upper surface toward the lower surface of said plate for receiving in mated engagement a non-circular portion of a bolt selected from the group consisting of a bolt head and a nut, c) a circular bore extending upward from said lower surface to penetrate a portion of said central cavity, being co-axially disposed thereto such that the non-circular portion of a bolt is retained in said cavity with the shaft of the bolt extending through said circular bore, d) a peripheral region disposed between the edge of the fastener and the central bore wherein said peripheral region of the fastener is thinner than the portion of the fastener adjacent said cavity, e) two or more holes disposed in said peripheral region extending between the upper and lower surface to secure the fastener to an object in contact with the lower surface thereby preventing rotation about said circular bore f) wherein the fastener is thinner in regions circumscribing each of said holes than in the region adjacent said cavity, and each of said holes is separated from an adjacent hole by a rib.

2. A fastener according to claim 1 wherein said holes are equally spaced about the periphery of the circular bore between the edge of the fastener and said cavity.

3. A fastener according to claim 1 wherein the ribs taper in thickness from the portion of the fastener adjacent to said cavity toward the thinner peripheral region adjacent each hole.

4. A fastener according to claim 1 wherein the portion of the area around each hole adjacent to said cavity is a flat area bounded by an arc connecting each of the adjacent ribs.

5. A fastener according to claim 1 wherein the polygonal shape has six sides.

6. A fastening system comprising;
a) a bolt comprising a threaded shaft terminated by a non-circular head,
b) at least one annular plate having;
 i) a substantially planar lower surface,
 ii) an upper surface opposing said lower surface,
 iii) a polygonal shaped cavity of uniform lateral cross-section along its axial length extending downward from the upper surface toward the lower surface of said plate for receiving in mated engagement the non-circular head of said bolt,
 iv) a circular bore extending upward from said lower surface to penetrate a portion of said central cavity, being co-axially disposed thereto such that the non-circular portion of a bolt is retained in said cavity with the shaft of the bolt extending through said circular bore,
 v) a peripheral region disposed between the edge of the annular plate and the central bore wherein said peripheral region of the fastener is thinner than the portion of the annular plate adjacent said cavity,
 vi) two or more holes disposed in said peripheral region extending between the upper and lower surface to secure the annular plate to an object in contact with the lower surface thereby preventing rotation about said circular bore,
 vii) wherein said annular plate is thinner in regions circumscribing each of said holes than in the region adjacent said cavity and each of said holes is separated form an adjacent hole by a rib, c) a nut disposed on the threaded shaft to grasp one or more objects or structures disposed between the nut and bottom planar surface of said annular shaped member,
d) whereby the securing of said annular shaped member to the object precludes axial rotation about the threaded shaft and prevents the non-circular head from rotating as the nut is advanced along the threaded shaft to secure the object.

7. A fastening system according to claim 6 further comprising a second annular plate disposed on the opposite end of the shaft between said nut and said first annular plate for receiving said nut in the polygonal shaped cavity thereof such that securing the second annular plate to the opposite side of the fastened object via said two or more holes precludes the loosening of said nut after tightening.

8. A fastening system according to claim 6 wherein said two or more of holes of said annular plate are equally spaced about the periphery of the circular bore between the edge of said annular plate and the cavity therein.

9. A fastening system according to claim 6 wherein the ribs of said annular plate taper in thickness from the portion of the fastener adjacent to said cavity toward the thinner peripheral region adjacent each hole.

10. A fastening system comprising:
a) a bolt comprising a threaded shaft terminated by a non-circular head,
b) a mating nut disposed about the threaded shaft,
c) a first and second annular shaped member that comprises
 i) a plate having
  (1) a substantially planar lower surface,
  (2) an upper surface opposing said lower surface,
 ii) a polygonal shaped cavity of uniform lateral cross-section along its axial length extending downward from the upper surface toward the lower surface of said plate for receiving in mated engagement either the non-circular head of said bolt or said nut,
 iii) a circular bore extending upward from said lower surface to penetrate a portion of said central cavity, being co-axially disposed thereto such that for
  (1) the first annular shaped member, the non-circular portion of the bolt is retained in said cavity with the shaft of the bolt extending through said circular bore, and
  (2) for the second annular shaped member, the nut is retained in said cavity with the threaded end of said shaft extending through said circular bore,
 iv) a peripheral region disposed between the edge of the plate and the circular bore wherein said peripheral region of the plate is thinner than the portion of the plateadjacent said cavity,
 v) two or more holes disposed in said peripheral region extending between the upper and lower surface to secure the plate to an object in contact with the lower surface thereby preventing rotation about said circular bore,
 vi) wherein said plate is thinner in regions circumscribing each of said holes than in the region adjacent said cavity and each of said holes is separated from an adjacent hole by a rib extending from the central cavity to the periphery of the plate,
d) wherein the substantially planar surface of said first annular shaped member is disposed facing the substantially planar surface of said second annular shaped member,
e) whereby securing the first annular shaped members to the object via the two or more holes precludes axial rotation of the bolt so as to permit tightening of said nut, and the subsequent securing of the second annular shaped members to the object via the one or more holes prevents the nut from reversing direction to either loosen the grip on the object or unthread from the shaft.

11. A fastening system according to claim 10 wherein at least one of said first and second annular members further has said holes equally spaced about the periphery of the circular bore between the edge of the fastener and said cavity.

12. A fastening system according to claim 10 wherein the said ribs taper in thickness from the portion of the plate adjacent to said cavity toward the thinner peripheral region adjacent each of said holes.

13. A method of fastening a first structure to a second structure, the method comprising:
    a) providing one or more holes that traverse an overlapping area of the structures to receive a cylindrical shaft, the shaft having a threaded end and a non-circular bolt end,
    b) providing a first and second annular washer having:
        i) a substantially planar lower surface,
        ii) an upper surface opposing the lower surface,
        iii) a polygonal shaped cavity of uniform lateral cross-section extending downward toward the lower surface of the washer for receiving in mated engagement a non-circular portion of a bolt selected from the group consisting of a bolt head and a nut,
        iv) a circular bore extending upward from said lower surface to penetrate a portion of said central cavity, being co-axially disposed thereto such that the non-circular portion of a bolt is retained in said cavity with the shaft of the bolt extending through said circular bore,
        v) a peripheral region disposed between the edge of the washer and the central bore wherein said peripheral region of the washer is thinner than the portion of the washer adjacent said cavity,
        vi) two or more holes disposed in said peripheral region extending between the upper and lower surface to secure the washer to an object in contact with the lower surface thereby preventing rotation about said circular bore,
        vii) each of said holes being separated from an adjacent hole by a rib,
    c) placing the first annular washer on the shaft, such that the bolt head engages within the central cavity thereof,
    d) inserting the shaft through the hole such that the flat face of the washer is adjacent the outer surface of the first structure with the threaded end extending to protrude from the second structure,
    e) securing the first washer to the first structure by inserting a nail or screw through one or more of the holes to prevent rotation about the shaft,
    f) inserting a second annular washer onto the threaded shaft, the flat face disposed toward the second structure,
    g) threading a nut onto the shaft as the non-circular head locks into the cavity of the first washer to prevent rotation of the threaded bolt,
    h) rotating the nut to advance it toward the fastener to urge the flat face of the second annular washer against the second structure, such that both the first and second washer grasp and compress the first and second structure.

14. The method of claim 13 further comprising the step of securing the second annular washer to the second structure by inserting a nail or screw through one or more of the holes to prevent rotation about the shaft.

15. The method of claim 13 wherein at least one of the first and second washer has said holes equally spaced about the periphery of the circular bore between the edge of the washer and said cavity.

* * * * *